US008112427B2

(12) United States Patent
DiFilippo

(10) Patent No.: US 8,112,427 B2
(45) Date of Patent: Feb. 7, 2012

(54) CRIMINAL BACKGROUND INVESTIGATION

(76) Inventor: Robert DiFilippo, Lakewood, OH (US)

( * ) Notice: Subject to any disclaimer, the term of this patent is extended or adjusted under 35 U.S.C. 154(b) by 605 days.

(21) Appl. No.: 12/234,051

(22) Filed: Sep. 19, 2008

(65) Prior Publication Data

US 2009/0077070 A1  Mar. 19, 2009

Related U.S. Application Data

(60) Provisional application No. 60/973,538, filed on Sep. 19, 2007.

(51) Int. Cl.
*G06F 7/00* (2006.01)
(52) U.S. Cl. ........................................................ 707/748
(58) Field of Classification Search .................. 707/736, 707/748, 705
See application file for complete search history.

(56) References Cited

U.S. PATENT DOCUMENTS

| | | | | |
|---|---|---|---|---|
| 6,658,412 B1 * | 12/2003 | Jenkins et al. | ........................ | 1/1 |
| 7,742,582 B2 * | 6/2010 | Harper | ..................... | 379/100.08 |
| 2006/0195351 A1 * | 8/2006 | Bayburtian | ........................ | 705/8 |
| 2007/0250459 A1 * | 10/2007 | Schwarz et al. | .............. | 705/500 |
| 2009/0012933 A1 * | 1/2009 | Verini, Jr. | ........................... | 707/3 |

OTHER PUBLICATIONS

Falk and Owens, 2005, Criminal Cse Process, pp. 1-5.*
1998, The criminal punishment code, pp. 1-8.*
KSG Desk Reference Manual, 2003, Sentencing Range—Non-drug offences, p. 1.*

* cited by examiner

*Primary Examiner* — Angela Lie
(74) *Attorney, Agent, or Firm* — Wayne D. Porter, Jr.

(57) ABSTRACT

A technique for conducting criminal background investigations addresses the problems of false negatives; false positives; and offense severity. The foregoing problems are managed by pre-scoring records within a data management system and comparing these scores with initial criteria. The resulting values are quickly returned using minimum real-time computational power. A result score is represented by three distinct values or three dimensions which can easily be represented by any 3-D graphical display or easily sorted highest to lowest for each dimension.

15 Claims, No Drawings

CRIMINAL BACKGROUND INVESTIGATION

REFERENCE TO RELATED APPLICATION

The present application claims priority from, and incorporates by reference, U.S. provisional application Ser. No. 60/973,538, filed Sep. 19, 2007 by Robert DiFilippo.

BACKGROUND OF THE INVENTION

1. Field of the Invention

The invention relates to background investigations and, more particularly, to criminal background investigations in which false negatives, false positives, and offense severity are taken into account.

2. Description of the Prior Art

It is common practice for employers to conduct background investigations, particularly criminal background investigations, of people that are being considered for an employment position. Unfortunately, prior investigative techniques have suffered from a number of drawbacks.

There are over three thousand counties in the U.S. and each county has an upper level or felony court. Moreover, there are over thirty thousand cities and towns. Each city or town can in turn have a local court which hears lower court cases for misdemeanor offenses.

Criminal databases can be compiled by gathering felony and misdemeanor court information throughout the United States and storing it in a single relational database. For commercial purposes the contents of this database usually are kept secret from the public to prevent competitors from comparing their content. Instead a search company will provide a "percentage of coverage" referring to the populations of counties instead of percentage of counties. The results of this obfuscation of database content create a number of problems such as false negatives, false positives, and other problems.

Desirably, a technique would be available that would enable an employer to conduct criminal background investigations effectively and accurately. Any such technique preferably would provide an "offense score" that would permit the entity conducting the investigation to have an objective measure of the reliability of the information.

SUMMARY OF THE INVENTION

The present invention provides a new and improved technique for conducting criminal background investigations. The invention is used to aid people in understanding records which may or may not be returned from a criminal background search. The invention addresses three main problems:
1) False Negatives
2) False Positives
3) Offense Severity The foregoing problems are managed by pre-scoring records within a data management system and comparing these scores with the initial criteria. The resulting values are quickly returned using minimum real-time computational power. A result score is represented by three distinct values or three dimensions which can easily be represented by any 3-D graphical display or easily sorted highest to lowest for each dimension. Specific techniques for carrying out the invention are described hereinafter.

DESCRIPTION OF THE PREFERRED EMBODIMENT

The first step in conducting a criminal background investigation is to determine the candidate, that is, the name of the person being searched. When a candidate's name is searched, it usually can be assumed that the candidate's date of birth, social security number, and addresses will be known by the screener. In searching for and evaluating records related to a candidate, it is desirable to take into account false negatives and false positives, and to provide a scored result of offenses committed by the candidate.

A false negative is a result which returns no records from a database search when a record should exist. This typically occurs when an offense occurred in a town or county where no data is available within the database. For example, if state has "70% Coverage" and the offense occurred in the missing 30% area.

A false positive is when a search is done, many records are returned and none relate to the candidate for whom information is being sought. This typically occurs with a common name and little additional restricting information such as date of birth or age.

There are many aspects to an offense which will determine its severity. Some of these aspects are the offense level, offense degree, offense disposition and the offense description itself. By abstracting this information into a formula, the severity of an offense can be easily identified and understood. The severity can be a standard configuration or customized for each particular customer or market.

1. Probability Dimension (False Negative Prevention)

Coverage Table: Build a table listing each County, Zip Code, Fip Number, Latitude and Longitude and population and availability.

Given one to many candidate's addresses: x

And the distance where 80% of crimes occur from a residence: y

Using the zip code and standard Haversine formula, a list of all counties within y miles of the given county can be produced. The values returned can be used to calculate probability measures. Other probability measures can be added to increase the accuracy of this score.

For two points on a sphere of radius R with latitudes $\phi 1$ and $\phi 2$, latitude separation $\Delta\phi=\phi 1-\phi 2$, and longitude separation $\Delta\lambda$, where angles are in radians, the distance d between the two points (along a great circle of the sphere) is related to their locations by the formula:

$$\operatorname{haversin}\left(\frac{d}{R}\right) = \operatorname{haversin}(\Delta\phi) + \cos(\phi_1)\cos(\phi_2)\operatorname{haversin}(\Delta\lambda)$$

Let h denote haversin(d/R), given from above. One can then solve for d either by simply applying the inverse haversine (if available) or by using the arc sine (inverse sine) function:

$$d = R \operatorname{haversin}^{-1}(h) = 2R \arcsin(\sqrt{h})$$

Probability Measure 1:

Pt=Population Total of counties within a y mile radius of x

Pc=Population Contained/data available.

Pc/Pt=Px=Percent of Population Contained.

Probability Measure 2:

Ct=Total number of Counties within a y mile radius of x

Cc=Total number of Counties Contained or that data is available.

Cc/Ct=Cx=Percent of Counties Contained.

Other Probability Measures: n. Other probability measures can be added as needed. Such measures might include a distance measure which will add the highest point value to the county of residence, and lower point values for surrounding counties.

The probability dimension is then created by averaging the Probability Measures and subtracting an error constant E:

$$[(Px+Cx+\ldots+Nx)/N]-E$$

2. Confidence Dimension (False Positive Prevention)

$$[Fx]+[Lx]+[Bx]+[Sx]+[Tx]/5=\text{Confidence}$$

When a given name is searched and many results are returned, it is difficult to determine what records belong to the given name and which records do not. Filtering through many records to make a subjective guess regarding its accuracy is a long and tedious process. This second dimension weighs identifying values and statistics which will help identify the most likely results. Records with the most identifying characteristics will have a higher confidence rating then records with little information. There are several factors necessary to produce the Confidence Dimension.

Name commonality determines how common each first name and last name are in each state. All names in a database can be pre-scored to determine how common each name part is within each state. This is important so that states with the highest populations don't always get the highest scores. It can be assumed that names within a state criminal database are directly proportional to names within a state without criminal records. A state criminal database of names can be improved with census data or other statistical name information to improve results.

When a name is entered into the system, that name can be given a commonality score as well. This will be the Base Confidence Score, or the best score a user can expect for a given name.

Name Part Commonality Score is unique for each state. Each Name Part (last name, first name) can be given a value according to this "Commonality" function:

[Highest Name Count]/[Select Score Value]=[Common Factor]

Commonality Function:

[Name Occurrences]/([Common Factor]+(Score Value*1%))=Commonality

Last Name Commonality=Cx
First Name Commonality=Fx
Example:
Highest Name Count: 100,000
Selected Score Value (The desired value of a "high score"): 100
Name Icabod Occurs: 2
Common Factor: 100,000/100=1,000
Icabod Commonality (Fx):

$$Fx=2/(1{,}000+101)=100.99$$

Other ID Parts cannot necessarily be pre-scored; however, since these are just integers, when split apart they are easily calculated by finding the absolute value of the difference from the given name's DOB and SSN parts and the ones provided within the records. If a DOB or SSN do not exist on a record these ID Parts are 0.

For example: 10-ABS|[Existing DOB Month]|-[Given DOB Month]

For each ID part respectively.
Other Identifier parts are scored as follows:
Date Of Birth (DOB) Bx
DOB Month: 0-10
DOB Day: 0-30
DOB Year: 0-60
Social Security Number (SSN) Sx
SSN Part1: 0-25
SSN Part 2: 0-25
SSN Part 3: 0-50

Case or Offense Date information is based on years from 18th birthday. For example, in the event there is no DOB associated with a case, but we know it was filed before the candidate was 18, this record is less likely to be associated with this client. This value can be partially pre-scored in a database as well using the year of the case as an integer and using the candidate's provided DOB:

[File Date]−[DOBYear+18]=Tx

Distance from known address Dx:
Given 1 to many known addresses for a candidate:
Distance from record county to candidate address x (using Haversine Formula),
The most common distance which crimes occur within y
And our desired scoring value V (i.e. V=100 if that's our top score), the distance factor can be calculated using V*(y/x)=Dx Therefore, records within the common distance (y) increase the score by whole numbers and records beyond the common distance (y) increase the score only fractionally. Additional factors may be factored in to help refine the confidence score as long they are averaged over their weight.

3. Offense Severity

Since there are a finite number of offenses which can be extracted from a database each offense can be categorized with an offense score. Each Offense will be scored according to a manually created "Offense Mask". This offense mask is a 10×n grid with columns ranging from 0 to 9. Each row of this grid contains a general crime category. Each distinct offense will receive a 0 to 9 score for each category with the first category being the Offense level. This group of scores is combined (not added) to create a single n digit number which can be easily sorted. A standard scale will be given, however, by keeping the crime category scores separate, the order can be customized according to each customer's needs.

| | Scoring Table | | | | | | | | | |
|---|---|---|---|---|---|---|---|---|---|---|
| | 0 | 1 | 2 | 3 | 4 | 5 | 6 | 7 | 8 | 9 |
| Level | | MM | M1 | M2 | M3 | M4 | FD | FC | FB | FA |
| Victim | | | | | | | | | | |
| Violence | | | | | | | | | | |
| Weapon | | | | | | | | | | |
| Sex | | | | | | | | | | |
| Theft | | | | | | | | | | |
| Traffic | | | | | | | | | | |
| Domestic | | | | | | | | | | |
| Other | | | | | | | | | | |

For example, aggravated burglary felony C would have a standard Offense Mask/Severity of 722205000. Although this value is large, it can easily be sorted with a group of results. This value could also be adjusted if the customer were searching for Traffic offenses or considered some other category of greater value. This scale is subjective, and should be used to filter results higher and lower. These values would become more accurate over time as more evaluations are made.

Two additional factors can be factored in to this Offense Mask.
1) Multiply the score by −1 in the event that a definitive "Not Guilty" result is used.
2) Any result with a misdemeanor result can be multiplied by a diffusing factor 1/x based on the current Fair Credit Reporting Act (FCRA) rules of disclosing misdemeanor offenses where x=the number of years since either the case was filed, dismissed or the offense occurred.

By use of the present invention, a database can be graded based on a geographic match with a given candidate. False negatives and false positives can be minimized and an offense score can be created. The net result of using the invention is that the entity conducting the background investigation will have an objective measure of the reliability of the information found during the investigation.

Although the present invention has been described in detail, it will be apparent to those skilled in the art that various changes and modifications can be made without departing from the true spirit and scope of the invention as hereinafter claimed. It is intended that all such changes and modifications be encompassed within the present disclosure.

What is claimed is:

1. A method for conducting a criminal background investigation of a person by using a pre-existing computer database that contains information about many persons, comprising the steps of:
  determining identifying information about a person whose background is to be investigated;
  determining the probability that information concerning the person of interest is not available in the computer database, including creating at least one probability measure, said at least one probability measure including determining the number of counties within a predetermined distance of a given county;
  determining which information in the computer database relates to the person of interest and which does not;
  creating an offense array that ranks offenses by level of severity and general crime category;
  applying information about the person of interest to the offense array; and
  creating an offense score for the person of interest.

2. The method of claim 1, wherein the information in the computer database includes the names of counties, zip codes, fip numbers, and geographic location.

3. The method of claim 1, wherein the probability measure is calculated using the zip code of the person of interest and the Haversine formula.

4. The method of claim 1, wherein the step of determining which information in the computer database relates to the person of interest and which does not includes the step of determining the commonality of the name of the person of interest.

5. The method of claim 4, further including the step of determining the accuracy of other identifying information about the person of interest.

6. The method of claim 5, wherein the other identifying information includes date of birth and social security number.

7. The method of claim 1, wherein the step of creating an offense array that ranks offenses by level of severity lists categories of offenses on a scale of 0-9 and lists general crime categories that include victim, violence, weapon, sex, theft, traffic, and domestic or non-domestic.

8. The method of claim 7, further including the steps of taking into account whether the person was adjudicated to be not guilty and multiplying any misdemeanor results with a diffusing factor.

9. A method for conducting a criminal background investigation of a person, comprising the steps of:
  creating a computer database containing information about many persons;
  determining identifying information about a person whose background is to be investigated;
  determining the probability that information concerning the person of interest is not available in the computer database, including the step of creating at least one probability measure which includes determining the number of counties within a predetermined distance of a given county and wherein the probability measure is calculated using the zip code of the person of interest and the Haversine formula;
  determining which information in the computer database relates to the person of interest and which does not;
  creating an offense array that ranks offenses by level of severity and general crime category;
  applying information about the person of interest to the offense array; and
  creating an offense score for the person of interest.

10. The method of claim 9, wherein the information in the computer database includes the names of counties, zip codes, fip numbers, and geographic location.

11. The method of claim 9, wherein the step of determining which information in the computer database relates to the person of interest and which does not includes the steps of determining the commonality of the name of the person of interest and the accuracy of other identifying information that includes date of birth and social security number.

12. The method of claim 11, further including the step of weighting information about the person of interest as a function of the age of the information and the distance of the information from the person's known addresses.

13. The method of claim 9, wherein the step of creating an offense array that ranks offenses by level of severity lists categories of offenses on a scale of 0-9 and lists general crime categories that include victim, violence, weapon, sex, theft, traffic, and domestic or non-domestic.

14. The method of claim 13, further including the steps of taking into account whether the person was adjudicated to be not guilty and multiplying any misdemeanor results with a diffusing factor.

15. A method for conducting a criminal background investigation of a person by using a pre-existing computer database that contains information about many persons, comprising the steps of:
  determining identifying information about a person whose background is to be investigated;
  determining the probability that information concerning the person of interest is not available in the computer database;
  determining which information in the computer database relates to the person of interest and which does not, including the steps of determining the commonality of the name of the person of interest and weighting information about the person of interest as a function of the age of the information and the distance of the information from the person's known addresses;
  creating an offense array that ranks offenses by level of severity and general crime category;
  applying information about the person of interest to the offense array; and
  creating an offense score for the person of interest.

* * * * *